US011303204B1

(12) United States Patent
Zhao et al.

(10) Patent No.: US 11,303,204 B1
(45) Date of Patent: Apr. 12, 2022

(54) CONTROL CIRCUIT FOR MULTI-PHASE VOLTAGE REGULATOR AND ASSOCIATED CONTROL METHOD

(71) Applicant: Monolithic Power Systems, Inc., San Jose, CA (US)

(72) Inventors: Tao Zhao, San Jose, CA (US); Hang Shao, San Jose, CA (US); Dianbo Fu, San Jose, CA (US); Daocheng Huang, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/143,508

(22) Filed: Jan. 7, 2021

(51) Int. Cl.
*H02M 3/158* (2006.01)
*H02M 3/04* (2006.01)
*H02M 1/00* (2006.01)
*H02M 1/14* (2006.01)

(52) U.S. Cl.
CPC .............. *H02M 3/04* (2013.01); *H02M 1/00* (2013.01); *H02M 3/1586* (2021.05); *H02M 3/1588* (2013.01); *H02M 1/0064* (2021.05); *H02M 1/14* (2013.01)

(58) Field of Classification Search
CPC .... H02M 1/0064; H02M 1/0084; H02M 1/14; H02M 1/15; H02M 3/158; H02M 3/1584; H02M 3/1586; H02M 3/1588; H02M 3/04
See application file for complete search history.

(56) References Cited

U.S. PATENT DOCUMENTS

| 7,791,321 | B2 | 9/2010 | Ming |
| 9,041,373 | B2 | 5/2015 | Lijie |
| 9,270,178 | B2 | 2/2016 | Lijie |
| 9,496,792 | B2 | 11/2016 | Qian |
| 9,559,586 | B2 | 1/2017 | Qian |
| 10,348,197 | B2 | 7/2019 | Chao |
| 10,498,241 | B2 | 12/2019 | Xiaokang |
| 10,516,337 | B2 * | 12/2019 | Ojika ................... H02M 3/155 |
| 2012/0286750 | A1 * | 11/2012 | Xu .................... H02M 3/156 323/282 |
| 2018/0013348 | A1 * | 1/2018 | Paul ..................... H02M 3/157 |
| 2020/0169170 | A1 | 5/2020 | Tianzhu |
| 2021/0099084 | A1 * | 4/2021 | Cheng ................ H02M 3/1584 |
| 2021/0226536 | A1 * | 7/2021 | Couleur ............. H02M 1/0025 |
| 2021/0384821 | A1 * | 12/2021 | Chen .................. H02M 1/0025 |

* cited by examiner

*Primary Examiner* — Gary L Laxton
(74) *Attorney, Agent, or Firm* — Perkins Coie LLP

(57) ABSTRACT

A trans-inductor voltage regulator (TLVR) circuit has multiple phases and a switching circuit for each phase. Each switching circuit has a winding of a transformer as an output inductor. The other windings of the transformers are connected in series with a nonlinear compensation inductor. An on-time period of each switching circuit is reduced when a load transient condition occurs or when a load current starts to be stable after the load transient condition.

20 Claims, 15 Drawing Sheets

US 11,303,204 B1

CONTROL CIRCUIT FOR MULTI-PHASE VOLTAGE REGULATOR AND ASSOCIATED CONTROL METHOD

TECHNICAL FIELD

The present invention generally refers to electrical circuits, and more particularly but not exclusively refers to control circuits for multi-phase voltage regulators.

BACKGROUND

In power conversion applications, an interleaved multi-phase power supply is widely used in large power and large current condition since the interleaved multi-phase power supply may be able to provide a large output current with small current ripples, optimized thermal and power distributions. Embodiments of the present invention pertain to a control circuit of a multi-phase voltage regulator.

A trans-inductor voltage regulator (TLVR) is a type of multi-phase voltage regulator that uses a winding of a transformer as an output inductor. In a multiphase TLVR circuit, a winding of a transformer is employed as an output inductor of a phase, and the other windings of the transformers of all the phases are connected in a series loop to ground. Because of the series connection of the other windings, all of the phases are able to respond to a change in load current, allowing for a faster transient response compared to conventional voltage regulators.

SUMMARY

Embodiments of the present invention are directed to a trans-inductor voltage regulator (TLVR) circuit, configured to receive an input voltage and provide an output voltage to a load, the TLVR circuit comprising: a plurality of transformers, each of the plurality of transformers comprising a first winding and a second winding, the second windings of the plurality of transformers being connected in series; a plurality of switching circuits coupled in parallel between the input voltage and the output voltage, each of the switching circuits being connected to an output capacitor of the TLVR circuit by way of an output inductor, the output inductor being a first winding of a transformer of the plurality of transformers; a nonlinear compensation inductor that is connected in series with the second windings of the plurality of transformers, an inductance of the nonlinear compensation inductor varies with a current flowing through the nonlinear compensation inductor; and a control circuit, configured to provide a plurality of pulse width modulation (PWM) signals to control the plurality of switching circuits respectively, and the control circuit is configured to reduce an on-time period of each of the plurality of switching circuits when a load current starts to be stable after a load transient condition or when the load transient condition occurs.

Embodiments of the present invention are further directed to a control circuit for a multi-phase voltage regulator, the multi-phase voltage regulator having a plurality of switching circuits, each of the switching circuits being connected to an output capacitor of multi-phase voltage regulator by way of an output inductor, the control circuit comprising: a comparison circuit, configured to provide a comparison signal based on a reference signal and a feedback signal representative of an output voltage of the multi-phase voltage regulator; an on-time adjusting circuit, configured to provide an on-time threshold to control an on-time period of each of the plurality of switching circuits; and a plurality of PWM controllers, configured to provide a plurality of PWM signals based on the comparison signal and the on-time threshold to control the plurality of switching circuits respectively, each of the plurality of PWM controllers is configured to reduce the on-time period of a corresponding one of the plurality of switching circuits when a load current starts to be stable after a load transient condition or when the load transient condition occurs.

Embodiments of the present invention are further directed to a control circuit for a TLVR circuit, the TLVR circuit having a plurality of switching circuits, each of the switching circuits being connected to an output capacitor of the TLVR circuit by way of an output inductor being a first winding of a transformer of a plurality of transformers, and a compensation inductor is connected in series with a plurality of second windings of the plurality of transformers, the control circuit comprising: a comparison circuit, configured to provide a comparison signal based on a reference signal and a feedback signal representative of an output voltage of the multi-phase voltage regulator; an on-time adjusting circuit, configured to provide an on-time threshold to control an on-time period of each of the plurality of switching circuits; and a plurality of PWM controllers, configured to provide a plurality of PWM signals based on the comparison signal and the on-time threshold to control the plurality of switching circuits respectively, each of the plurality of PWM controllers is configured to reduce the on-time period of a corresponding one of the plurality of switching circuits when a load current starts to be stable after a load transient condition or when the load transient condition occurs.

Embodiments of the present invention are further directed to a control method used for a multi-phase voltage regulator, the multi-phase voltage regulator having a plurality of switching circuits, each of the switching circuits being connected to an output capacitor of the multi-phase voltage regulator by way of an output inductor, the control method comprising: turning on the plurality of switching circuits successively based on a feedback signal representative of an output voltage of the multi-phase voltage regulator and a reference signal; providing an on-time threshold to control an on-time period of each of the plurality of the switching circuits; turning off a corresponding one of the plurality of switching circuits when the on-time period of the corresponding one of the plurality of the switching circuits equals the on-time threshold; and decreasing the on-time period of each of the plurality of switching circuits when a load current starts to be stable after a load transient condition or when the load transient condition occurs.

These and other features of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
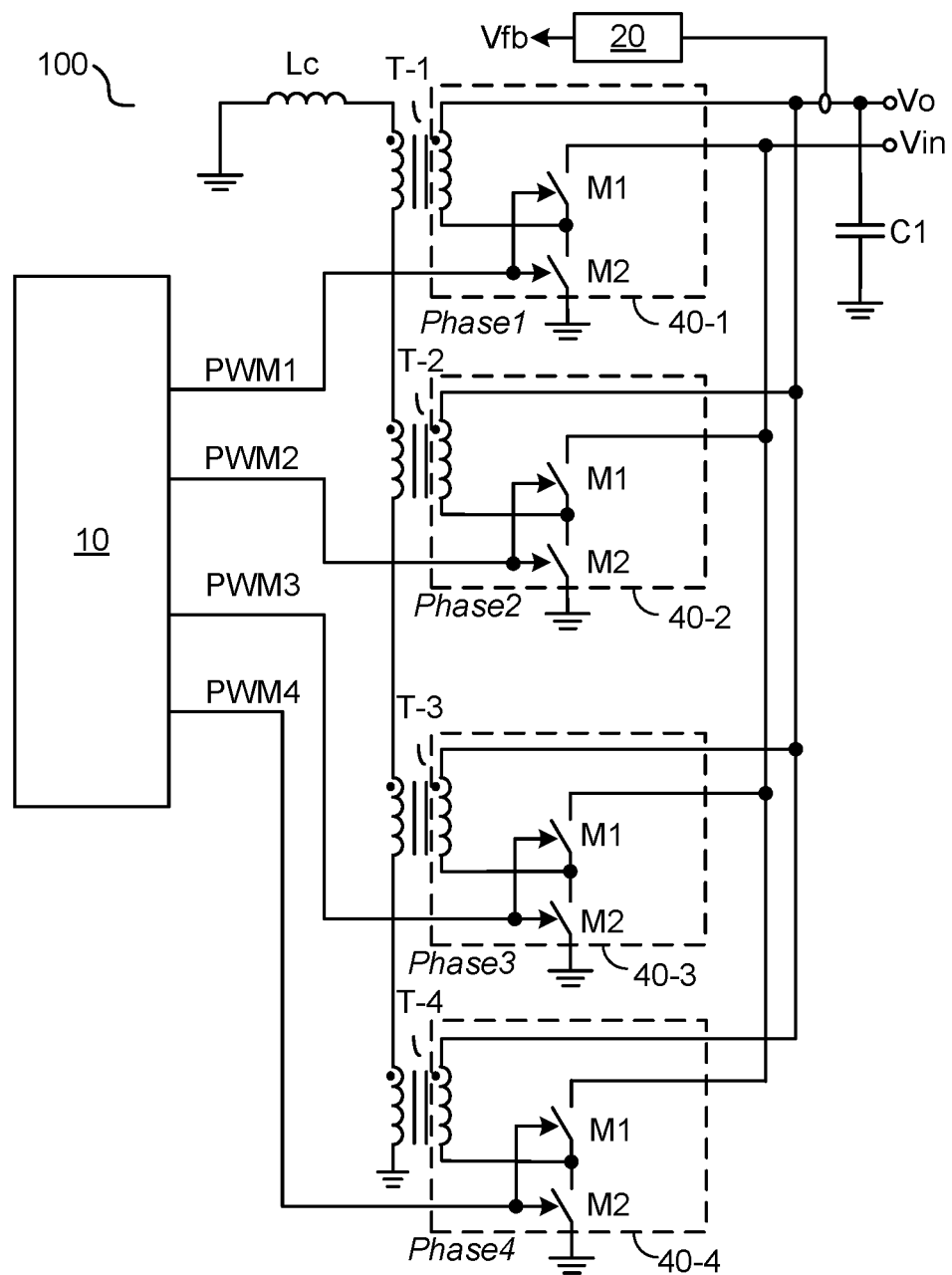
FIG. 1 schematically illustrates a TLVR circuit 100 in accordance with an embodiment of the present invention.

FIG. 1 schematically illustrates a TLVR circuit diagram 100 in accordance with an embodiment of the present invention. In the example of FIG. 1, the TLVR circuit 100 is a multiphase TLVR with four phases. As can be appreciated, the TLVR circuit 100 may also be implemented with fewer or more phases. As shown in FIG. 1, the TLVR circuit 100 is configured to receive an input voltage Vin and provide an output voltage Vo to a load, such as CPU (central processing unit), GPU (graphics processing unit), and other ASICs (application specific integrated circuits).

In the example of FIG. 1, The TLVR circuit 100 comprises a plurality of switching circuits 40 (i.e., 40-1, 40-2, 40-3, and 40-4), one for each phase. The switching circuits 40-1, 40-2, 40-3, and 40-4 are for phase1, phase 2, phase 3, and phase 4, respectively. The plurality of switching circuits 40-1, 40-2, 40-3, and 40-4 are coupled in parallel between the input voltage Vin and the output voltage Vo. And each of the plurality of switching circuits 40 may be a buck regulator comprising a high-side switch M1, a low-side switch M2 and an output inductor. In the example of FIG. 1, each of the plurality of switching circuits 40 has a corresponding transformer T whose primary winding serves as the output inductor. For example, referring to the switching circuit 40-1, a transformer T-1 has a primary winding with a first end that is connected to a switch node of the switches M1 and M2 and a second end that is connected to the output voltage Vo. The high-side switch M1 is coupled to the input voltage Vin, and the low-side switch M2 is coupled to a reference ground. The switches M1 and M2 are driven by a corresponding pulse width modulation signal (PWM). The PWM signals of all the phases (i.e., PWM1, PWM2, PWM3, and PWM4 as shown in FIG. 1) are interleaved to charge an output capacitor C1 to develop the output voltage Vo. The secondary winding of the transformer T-1 is connected in series with the secondary windings of transformers T-2, T-3, and T-4 of the switching circuits 40-2, 40-3, and 40-4, respectively. A compensation inductor Lc is connected in series with the secondary windings of the transformers T-1, T-2, T-3, and T-4. The compensation inductor loop (i.e., the series-connected compensation inductor Lc and the secondary windings of transformers T-1, T-2, T-3, and T-4) is grounded. Each transformer T may have a primary to secondary turns ratio of 1:1, for example.

In one embodiment, the compensation inductor Lc is nonlinear in that the inductance is not a constant throughout the entire operating region. More particularly, the compensation inductor Lc is configured to have an inductance that is large when the compensation inductor current (i.e., current ILc flowing through the compensation inductor Lc) is low and an inductance that is small when the compensation inductor current is high. The compensation inductor current is typically low during a load steady state condition (i.e., when the current drawn by the load is non-varying at a stable level) and high during a load transient condition. The load transient condition occurs when there is a sudden increase or decrease in current demanded by the load. By increasing the inductance of the compensation inductor Lc when the compensation inductor current is low, the ripple on the output voltage Vo is reduced when the load current is at the steady state condition. By reducing the inductance of the compensation inductor Lc when the compensation inductor current is high, the TLVR circuit 100 is able to respond faster to the load transient condition.

In the example of FIG. 1, the TLVR circuit 100 is depicted as having a single primary winding and a single secondary winding for illustration purposes. As can be appreciated, embodiments of the present invention are also applicable to TLVR circuits with different numbers of transformer windings.

The control circuit 10 is configured to provide a plurality of PWM signals (i.e., PWM1, PWM2, PWM3 and PWM4 as shown in FIG. 1) to control the plurality of switching circuits 40 respectively, that is to drive the high-side switch M1 and the low-side switch M2 respectively in each of the plurality of switching circuits 40.

In the example of FIG. 1, the TLVR circuit 100 comprises a voltage feedback circuit 20. The voltage feedback circuit 20 is configured to provide a feedback signal Vfb representative of the output voltage Vo.

For the TLVR circuit 100, the inductance of the nonlinear compensation inductor Lc turns small during the load transient condition, and takes time to recover after the load transient condition. The output voltage ripple is thus large during a recovery period (i.e., a time period the inductance of the nonlinear compensation inductor Lc recovers from small). In one embodiment, the control circuit 10 is configured to reduce an on-time period Toni (i.e., an on-time period of the high-side switch M1) of each of the plurality of switching circuits 40 for a preset time period (e.g., 400 us), thus the control circuit 10 can effectively reduce the output voltage ripple of the TLVR circuit 100.

Figure 2:
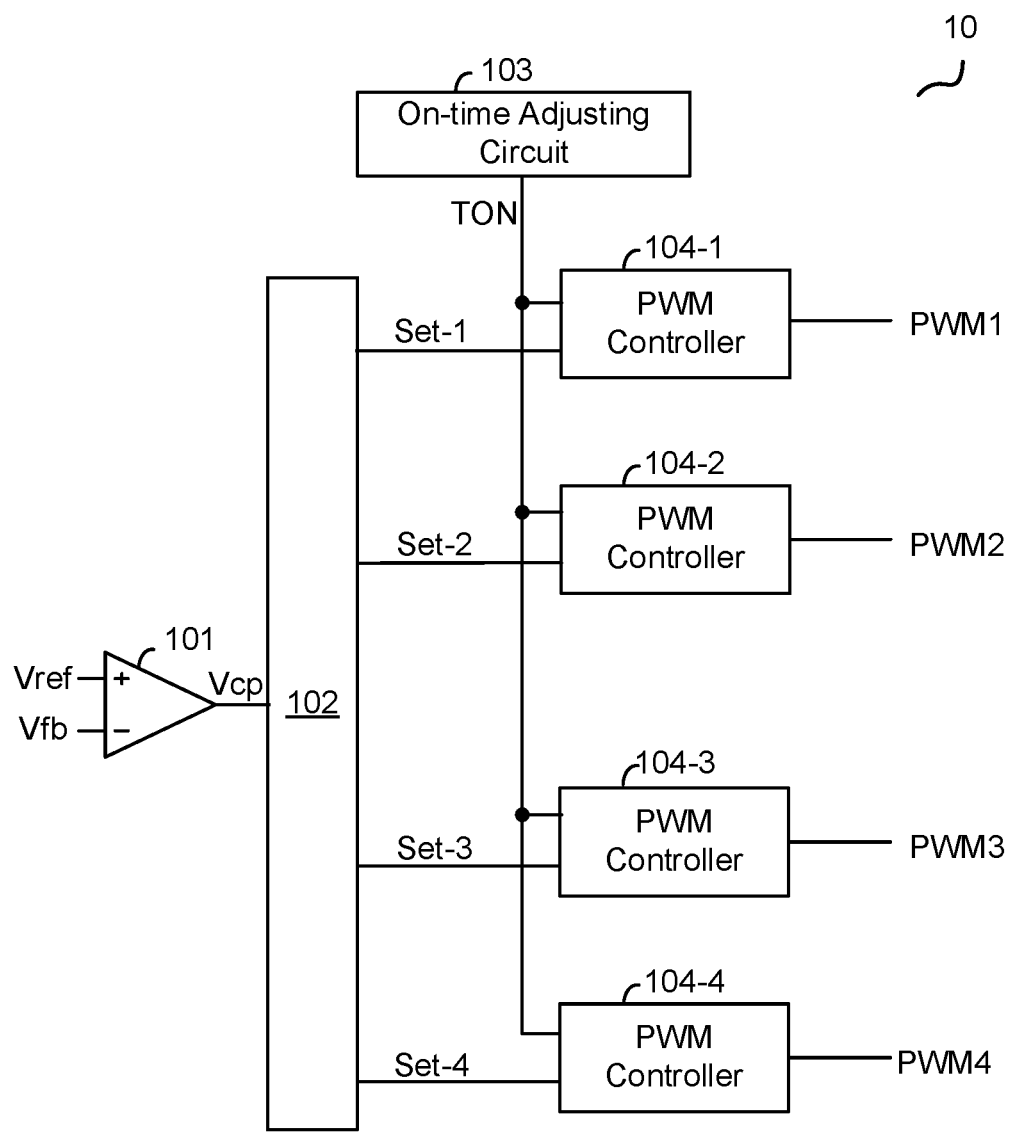
FIG. 2 schematically illustrates a control circuit 10 of the TLVR circuit 100 shown in FIG. 1 in accordance with an embodiment of the present invention.

FIG. 2 schematically illustrates the control circuit 10 of the TLVR circuit 100 shown in FIG. 1 in accordance with an embodiment of the present invention. In the example of FIG. 2, the control circuit 10 comprises a comparison circuit 101, a signal distribution circuit 102, an on-time adjusting circuit 103, and a plurality of PWM controllers 104 (i.e., 104-1, 104-2, 104-3, and 104-4).

The comparison circuit 101 is configured to receive the feedback signal Vfb and a reference signal Vref, and is configured to provide a comparison signal Vcp via comparing the feedback signal Vfb with the reference signal Vref. In one embodiment, a compensation signal Vslope may be added to the feedback signal Vfb or be subtracted from the reference signal Vref for stability.

The signal distribution circuit 102 is configured to receive the comparison signal Vcp and is configured to distribute the comparison signal Vcp to a plurality of set signals Set (i.e., Set-1, Set-2, Set-3, and Set-4) successively. Each of the plurality of switching circuits 40 is turned on (e.g., each of the high side switch M1 is turned on) based on a corresponding set signal Set via a corresponding PWM controller 104.

The on-time adjusting circuit 103 is configured to provide an on-time threshold TON to control the on-time period Toni of each of the switching circuits 40. For example, when the on-time period Toni of one of the plurality of switching circuits 40 reaches the on-time threshold TON, the corresponding one of the plurality of switching circuits 40 is turned off by corresponding PWM controller 104. The on-time threshold TON equals a default value Tdft during the load steady state condition, and the on-time threshold TON is adjusted to be less than the default value Tdft during or after the load transient condition.

Each of the plurality of PWM controllers 104 is configured to receive the corresponding set signal Set and the on-time threshold TON, and is configured to provide the corresponding PWM signal to control the corresponding switching circuit 40. For example, PWM controller 104-1 is configured to receive the set signal Set-1 and the on-time threshold TON, and is configured to provide signal PWM1 to drive the high-side switch M1 and the low-side switch M2 of the switching circuit 40-1 based on the set signal Set-1 and the on-time threshold TON (e.g., turn on the high-side switch M1 and turn off the low-side switch M2 when the set signal Set-1 is effective and turn off the high-side switch M1 and turn on the low-side switch M2 when the on-time period Toni of the high side switch M1 reaches the on-time threshold TON).

In one example, the control circuit 10 is employed to control the TLVR circuit 100 with the nonlinear compensation inductor Lc. However, as can be appreciated, the control circuit 10 can also be used to control a TLVR circuit with linear compensation inductor or other topology of multi-phase voltage regulator.

Figure 3:
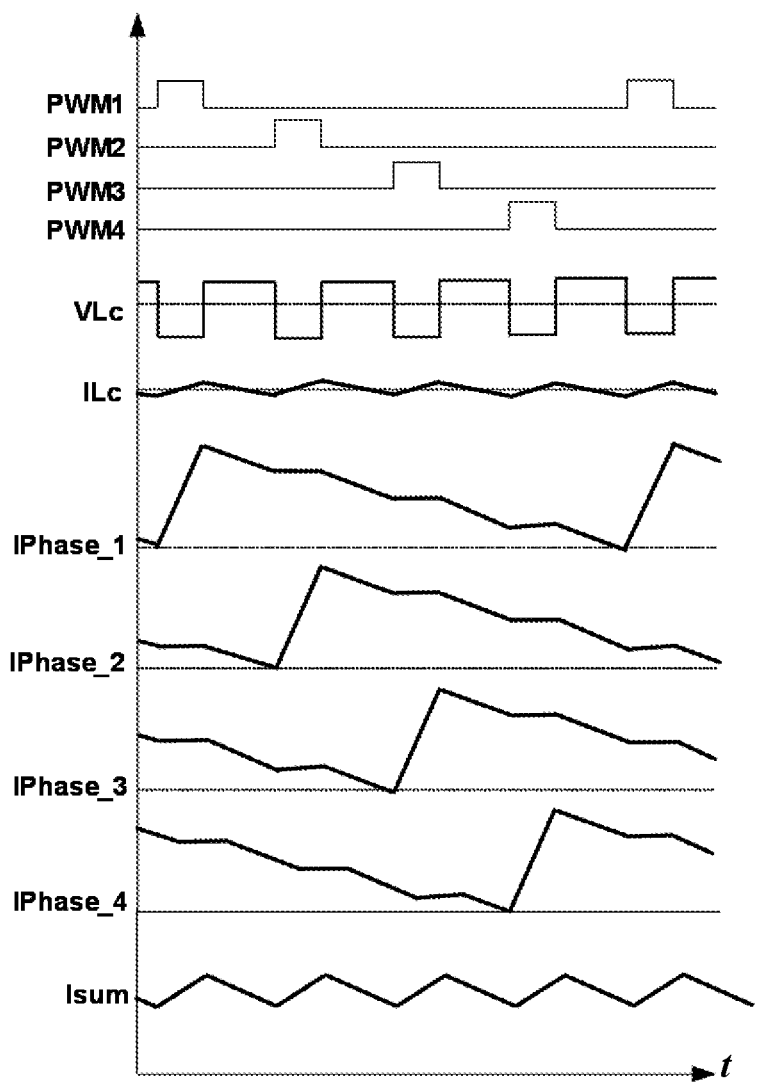
FIG. 3 shows a timing diagram of signals of the TLVR circuit 100 during a load steady state condition in accordance with an embodiment of the present invention.

FIG. 3 shows a timing diagram of signals of the TLVR circuit 100 during the load steady state condition in accordance with an embodiment of the present invention. FIG. 3 shows, from top to bottom, the signal PWM1 (i.e., PWM signal driving the switching circuit 40-1), the signal PWM2 (i.e., PWM signal driving the switching circuit 40-2), the signal PWM3 (i.e., PWM signal driving the switching circuit 40-3), the signal PWM4 (i.e., PWM signal driving the switching circuit 40-4), compensation inductor voltage VLc, compensation inductor current ILc, current IPhase1 (i.e., output current of the switching circuit 40-1), current IPhase2 (i.e., output current of the switching circuit 40-2), current IPhase3 (i.e., output current of the switching circuit 40-3), current IPhase4 (i.e., output current of the switching circuit 40-4), and a current Isum. The current Isum is the sum of currents IPhase1, IPhase2, IPhase3, and IPhase4.

In general, the high-frequency current ripple on each of the phases adds up and is reflected on the output voltage Vo because all of the phases are in parallel. In the example of FIG. 3, the compensation inductor current ILc is responsive to a steady state load and is thus relatively small. The small compensation inductor current ILc increases the inductance of the compensation inductor Lc, thereby minimizing the ripple on the output voltage Vo.

Figure 4A:
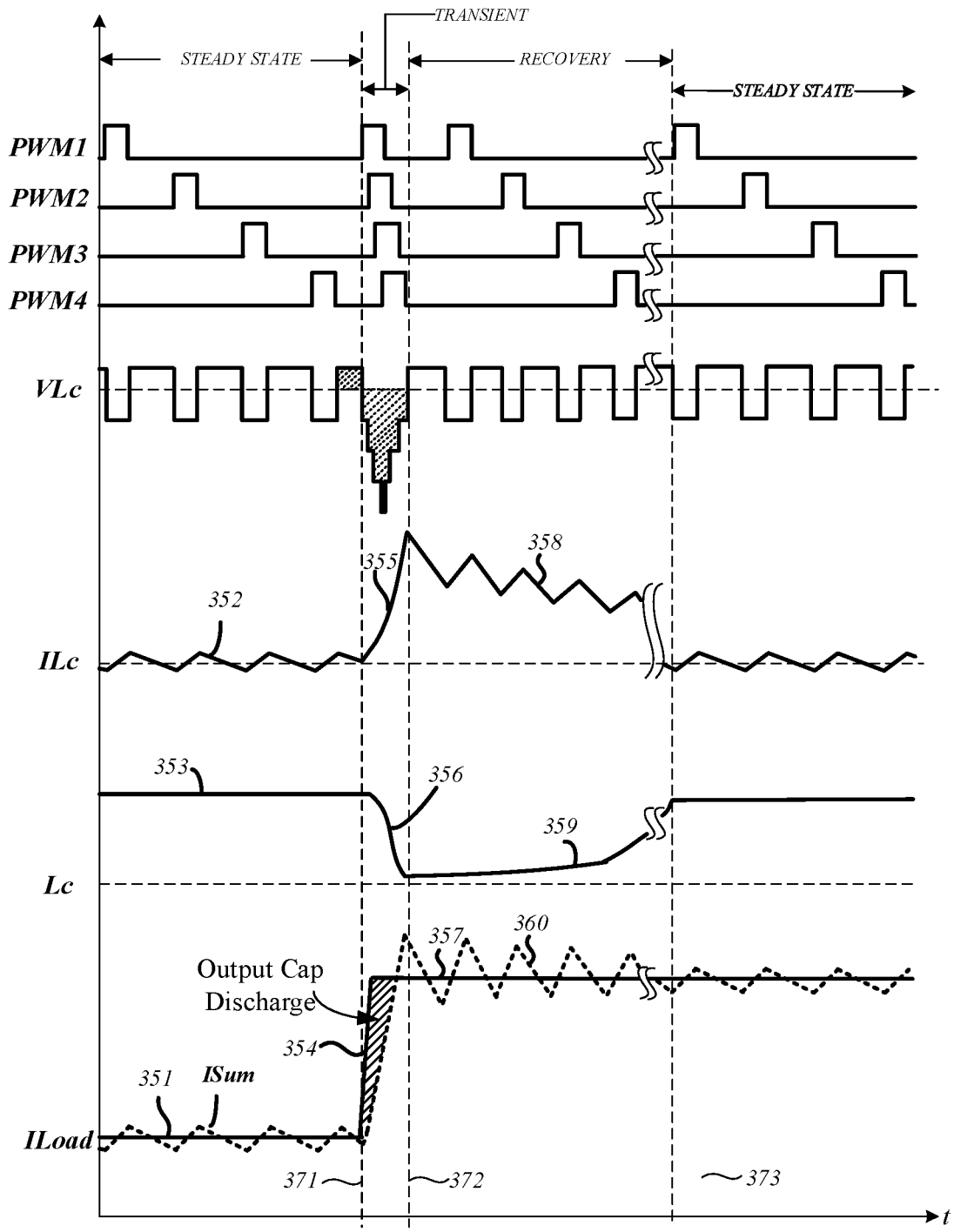
FIGS. 4A-4C shows a timing diagram of signals of the TLVR circuit 100 during a load step up transient condition in accordance with an embodiment of the present invention.
Figure 4B:
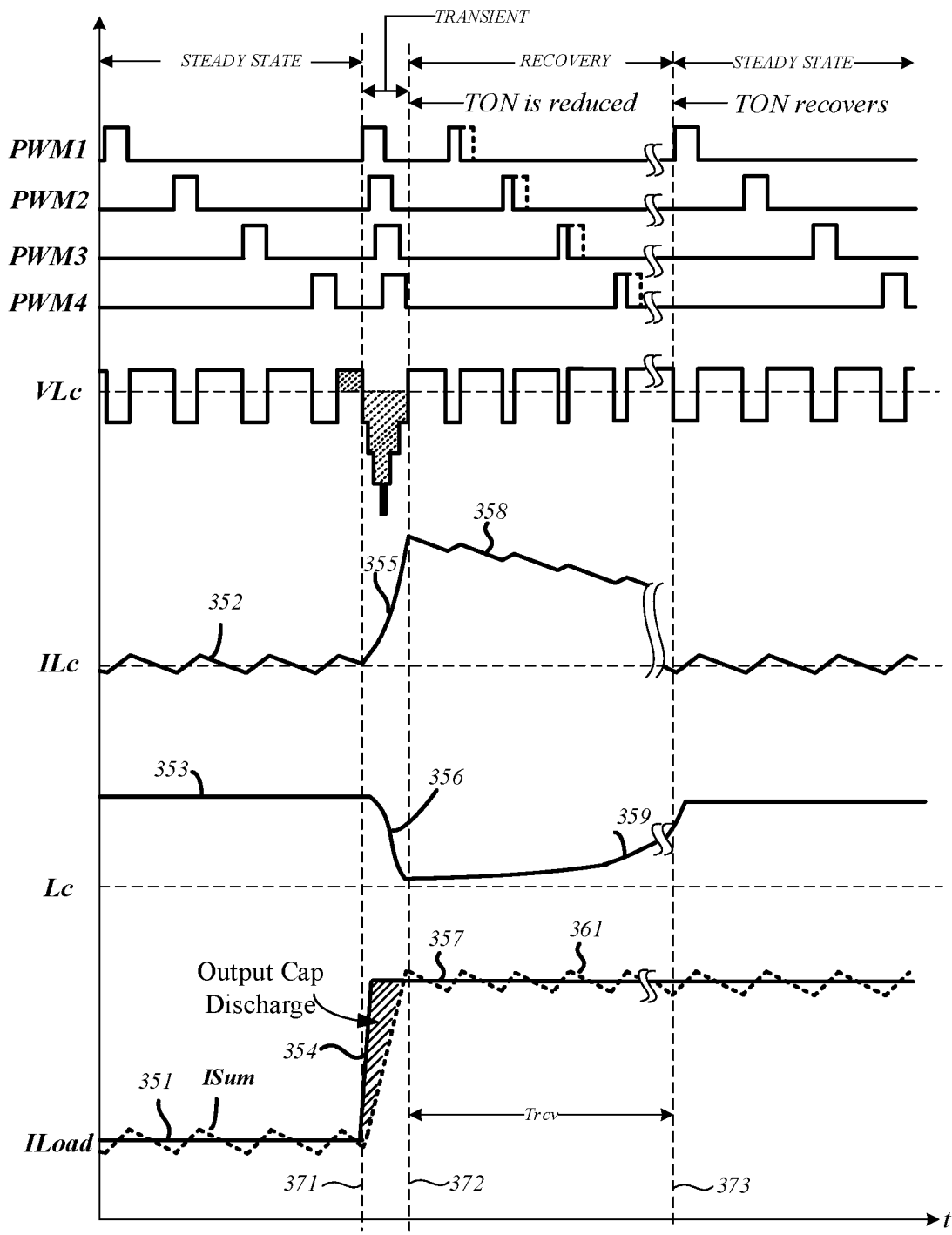
Figure 4C:
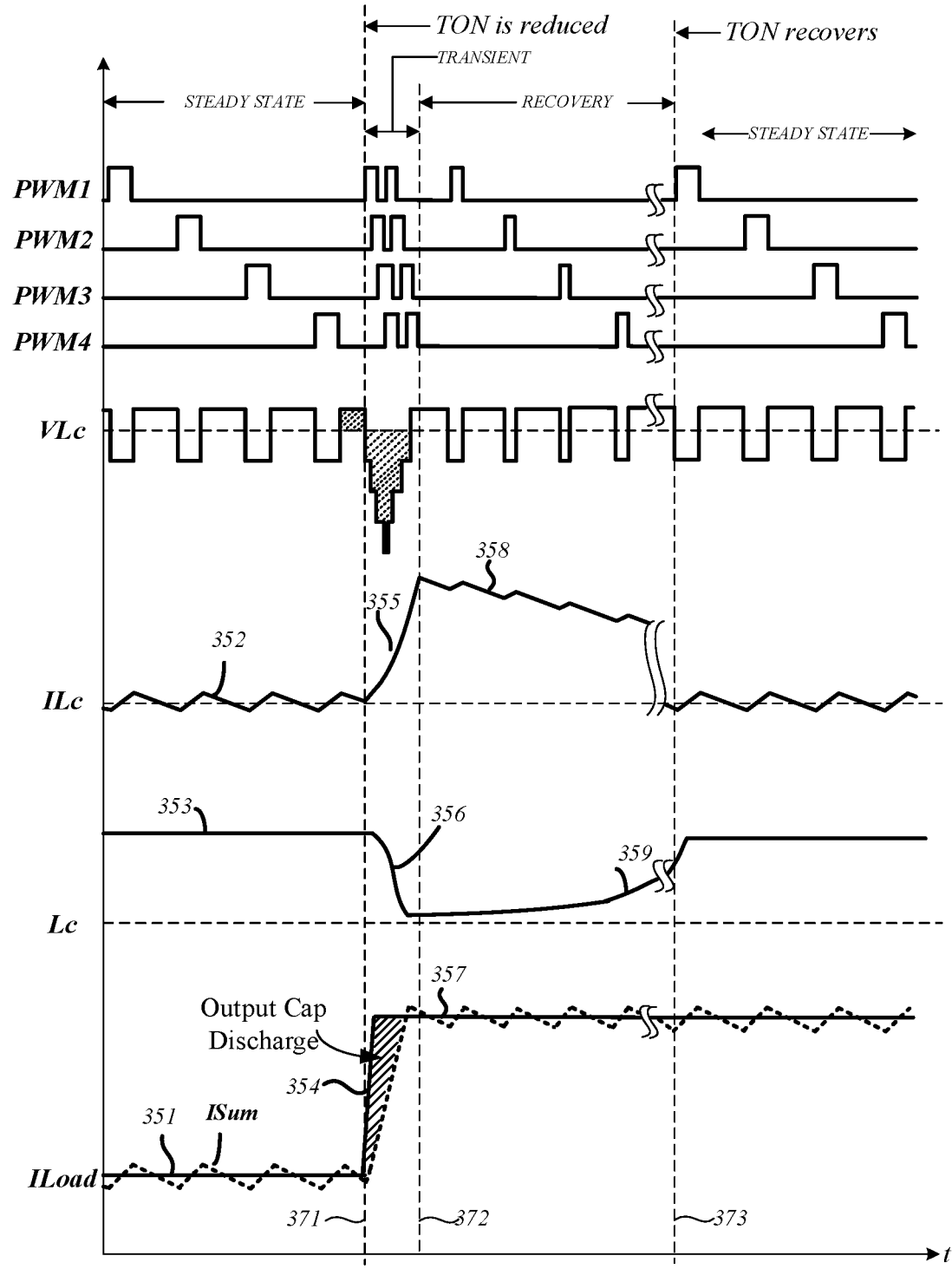

FIGS. 4A-4C shows a timing diagram of signals of the TLVR circuit 100 during a load step up transient condition in accordance with an embodiment of the present invention. Each of FIGS. 4A-4C shows, from top to bottom, the signal PWM1, the signal PWM2, the signal PWM3, the signal PWM4, the compensation inductor voltage VLc, the compensation inductor current ILc, the inductance Lc of the compensation inductor Lc, and the current Isum superimposed on the load current ILoad (i.e., current drawn by the load from the TLVR circuit 100). In the example of FIGS. 4A-4C, the load step up transient condition comprises a sudden increase of the load current.

As shown in FIG. 4A, prior to a time point 371, the load current ILoad is at steady state (see 351). Accordingly, the responsive compensation inductor current ILc is small (see 352), which causes the inductance Lc to be large (see 353), thereby minimizing ripple. In the example of FIG. 4A, the on-time period Toni (i.e., a time period that each of the PWM signals is at a high voltage level) of each of the plurality of switching circuits 40 equals a default value Tondft. At the time point 371, the load transient condition occurs when the load current ILoad increases at a high rate (see 354). In response, the compensation inductor current ILc increases (see 355). The inductance Lc decreases sharply (see 356) when the compensation inductor current ILc increases to a current threshold. The decreased inductance Lc allows the TLVR circuit 100 to rapidly respond to the load transient condition. At a time point 372, the load current ILoad starts to be stable at a high current level (see 357), which causes the compensation inductor current ILc to decrease slowly (see 358), and the inductance Lc increases (see 359) with the compensation inductor current ILc. The inductance Lc takes time to recover after the load transient condition, ripple of the current Isum is large (see 360), and the output voltage ripple is thus large during the recovery period (e.g., from the time point 372 to the time point 373).

In the example of FIG. 4B, the on-time period Toni of each of the plurality of switching circuits 40 is reduced from the default value Tondft when the load current ILoad starts to be stable after the load transient condition. For example, at the time point 372, the load current ILoad starts to be stable at a high current level (see 357), the on-time threshold TON provided by the on-time adjusting circuit 103 is reduced, i.e., the on-time period Toni of each of the plurality of switching circuits 40 is reduced for the preset time period (e.g., Trcv from the time point 372 to a time point 373 as shown in FIG. 4B), ripple of the current Isum is reduced (see 361), thereby minimizing ripple on the output voltage. In the example of FIG. 4B, the preset time period equals the recovery time period. However, one with ordinary skill in the art should understand that the preset time period may be longer than the recovery time period, or be shorter than the recovery time period. At the time point 373, the compensation inductor current ILc decreases below the current threshold, the inductance Lc increases to the larger value at the steady state, and the on-time threshold TON recovers to the default value Tondft, i.e., the on-time period Toni of each of the plurality of switching circuits 40 recovers to the default value Tondft.

In the example of FIG. 4C, the on-time period Toni of each of the plurality of switching circuits 40 is reduced from the default value Tondft when the load transient condition occurs. For example, at a time point 371, the load transient condition occurs when the load current ILoad increases at a high rate (see 354), the on-time threshold TON provided by the on-time adjusting circuit 103 is reduced, i.e., the on-time period Toni of each of the plurality of switching circuits 40 is reduced, to further rapidly respond to the load transient condition, especially with high frequency load transient caused by CPU turbo, e.g., the load current ILoad increases at a high rate and then quickly decreases at a high rate.

Figure 5A:
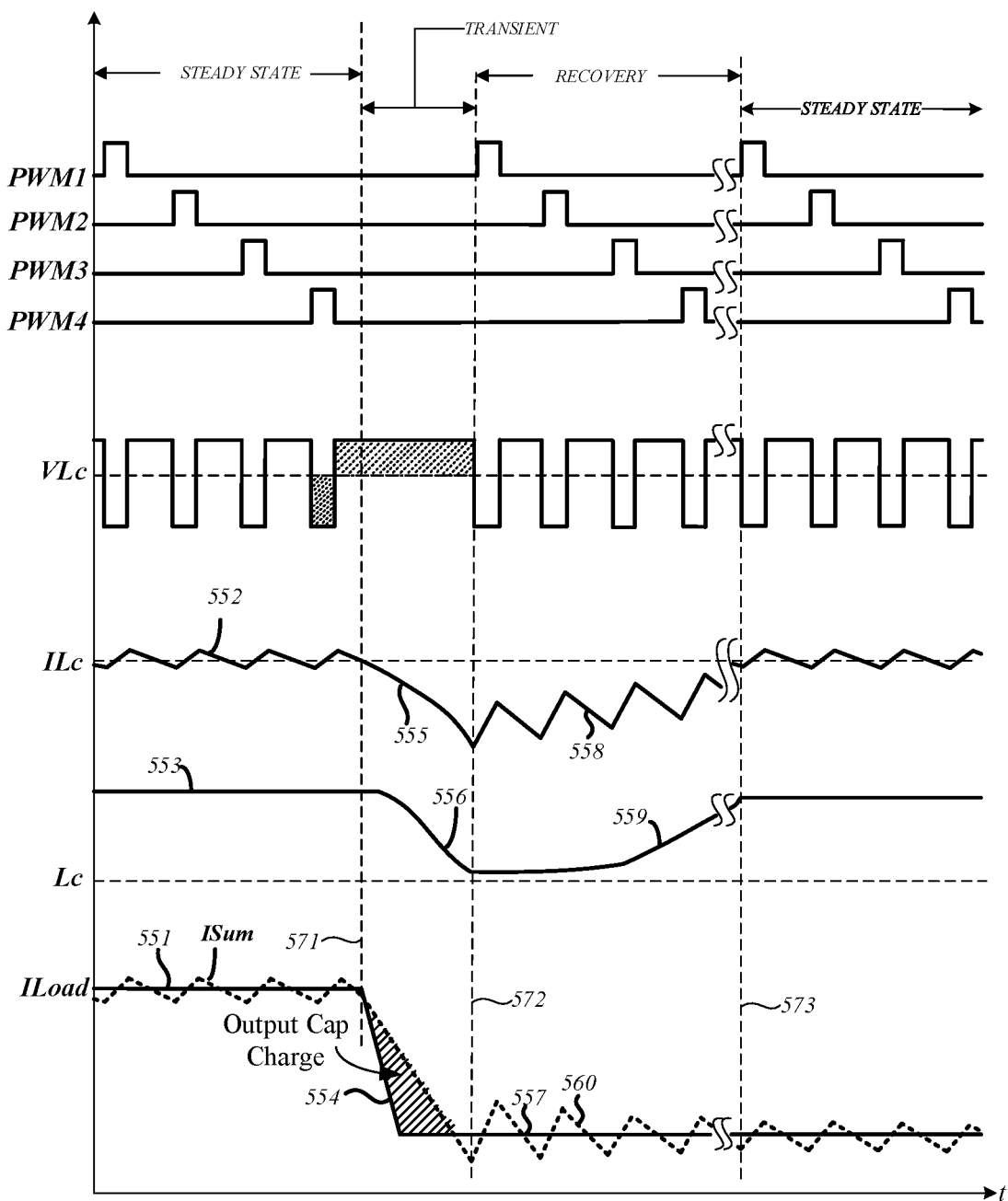
FIGS. 5A-5C shows a timing diagram of signals of the TLVR circuit 100 during a load step down transient condition in accordance with an embodiment of the present invention.
Figure 5B:
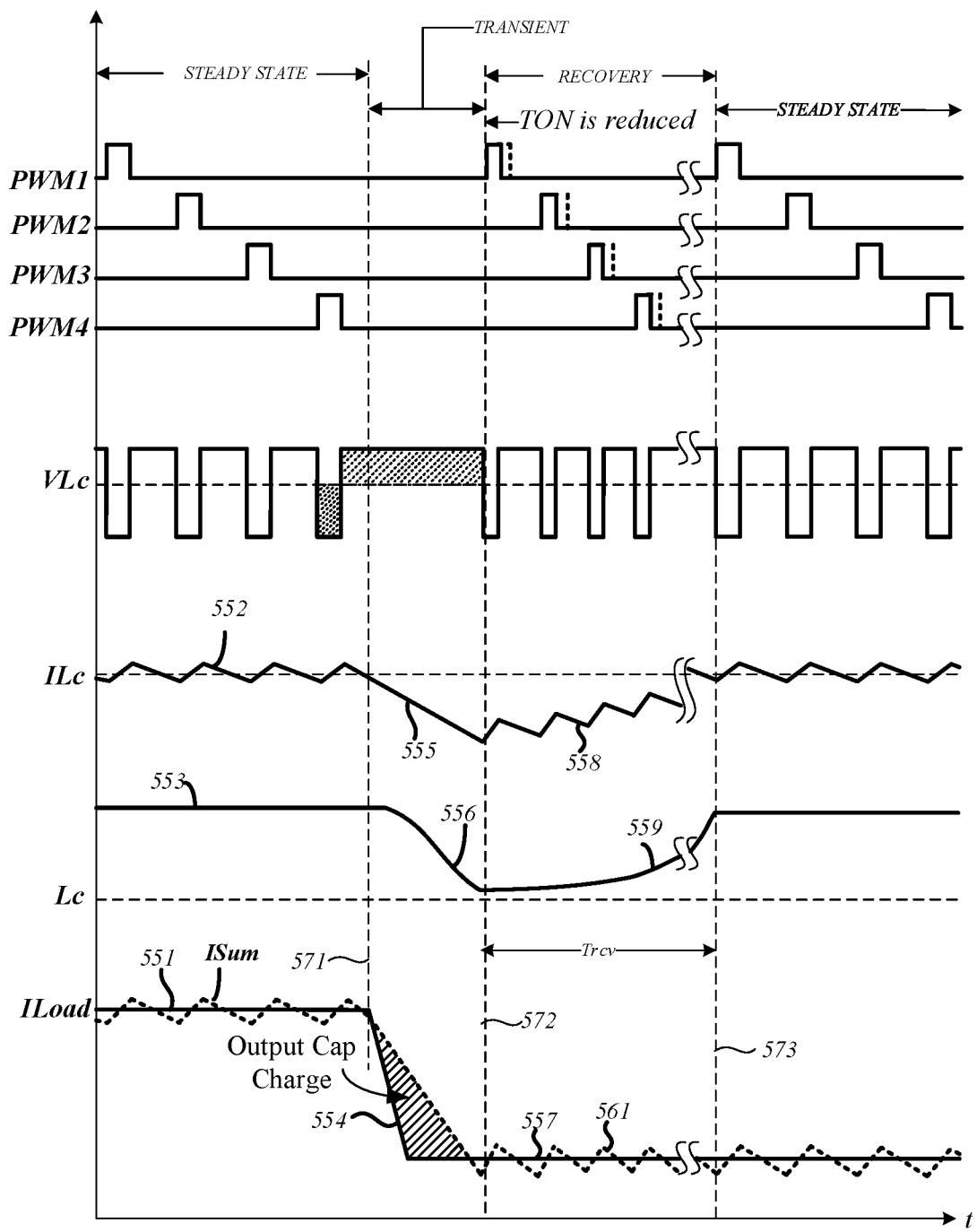
Figure 5C:
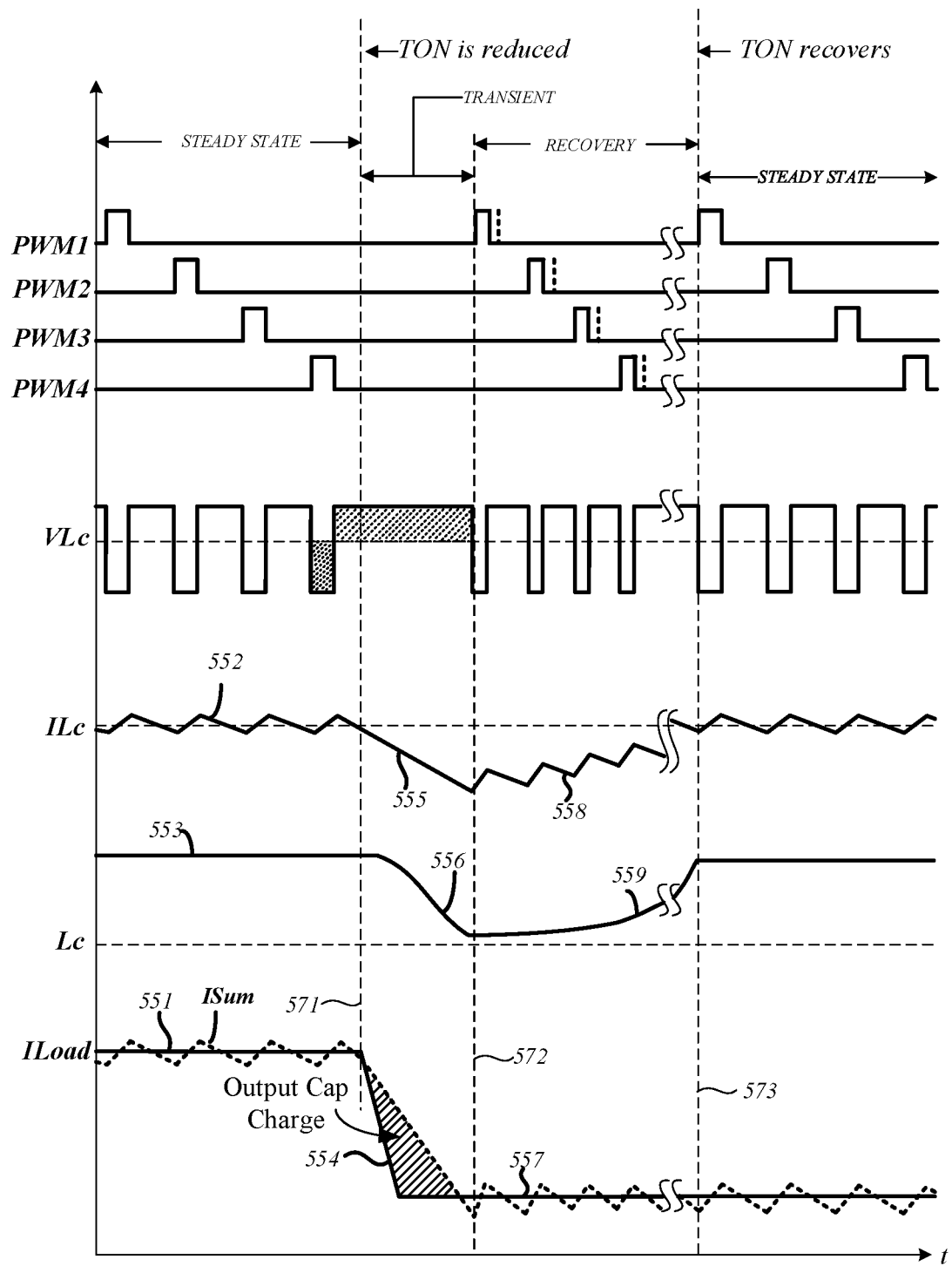

FIGS. 5A-5C shows a timing diagram of signals of the TLVR circuit 100 during a load step down transient condition in accordance with an embodiment of the present invention. Each of FIGS. 5A-5C shows, from top to bottom, the signal PWM1, the signal PWM2, the signal PWM3, the signal PWM4, the compensation inductor voltage VLc, the compensation inductor current ILc, the inductance Lc of the compensation inductor Lc, and the current Isum superimposed on the load current ILoad. In the example of FIGS. 5A-5C, the load step down transient condition comprises a sudden decrease of the load current.

As shown in FIG. 5A, prior to a time point 571, the load current ILoad is at steady state (see 551). Accordingly, the responsive compensation inductor current ILc is small (see 552), which causes the inductance Lc to be large (see 553), thereby minimizing ripple. In the example of FIG. 5A, the on-time period Toni of each of the plurality of switching circuits 40 equals the default value Tondft. At the time point 571, the load transient condition occurs when the load current ILoad decreases at a high rate (see 554). In response, the compensation inductor current ILc decreases to negative, i.e., increases reversely (see 555). The inductance Lc decreases sharply (see 556) when the compensation inductor current ILc decreases to a negative current threshold. The decreased inductance Lc allows the TLVR circuit 100 to rapidly respond to the load transient condition. At a time point 572, the load current ILoad starts to be stable at a low current level (see 557), which causes the compensation inductor current ILc to increase, i.e., to decrease reversely (see 558), and the inductance Lc increases (see 559) with the compensation inductor current ILc. The inductance Lc takes time to recover after the load transient condition, ripple of the current Isum is large (see 560), and the output voltage ripple is thus large during the recovery period (e.g., from the time point 572 to the time point 573).

In the example of FIG. 5B, the on-time period Toni of each of the plurality of switching circuits 40 is reduced from the default value Tondft when the load current ILoad starts to be stable after the load transient condition. For example, at time point 572, the load current ILoad starts to be stable at a low current level (see 557), the on-time threshold TON provided by the on-time adjusting circuit 103 is reduced, i.e., the on-time period Toni of each of the plurality of switching circuits 40 is reduced for the preset time period (e.g., Trcv from the time point 572 to a time point 573 as shown in FIG. 5B), ripple of the current Isum is reduced (see 561), thereby minimizing ripple on the output voltage. In the example of FIG. 5B, the preset time period equals the recovery time period. However, one with ordinary skill in the art should understand that the preset time period may be longer than the recovery time period, or be shorter than the recovery time period. At the time point 573, the compensation inductor current ILc increases above the negative current threshold, the inductance Lc increases to the larger value at the steady state, and and the on-time threshold TON recovers to the default value Tondft, i.e., the on-time period Toni of each of the plurality of switching circuits 40 recovers to the default value Tondft.

In the example of FIG. 5C, the on-time period Toni of each of the plurality of switching circuits 40 is reduced from the default value Tondft when the load transient condition occurs. For example, at a time point 571, the load transient condition occurs when the load current ILoad decreases at a high rate (see 554), the on-time threshold TON provided by the on-time adjusting circuit 103 is reduced, i.e., the on-time period Toni of each of the plurality of switching circuits 40 is reduced, to further rapidly respond to the load transient condition, especially with high frequency load transient caused by CPU turbo, e.g., the load current ILoad decreases at a high rate and then quickly increases at a high rate.

Figure 6:
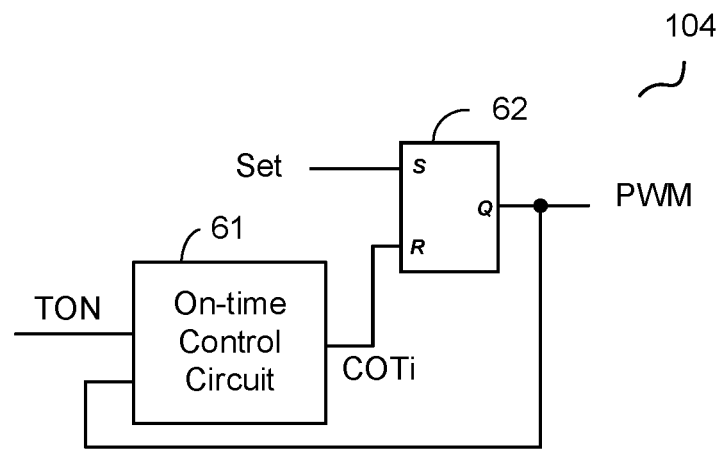
FIG. 6 schematically illustrates a PWM controller 104 of the control circuit 10 shown in FIG. 2 in accordance with an embodiment of the present invention.

FIG. 6 schematically illustrates a PWM controller 104 of the control circuit 10 shown in FIG. 2 in accordance with an embodiment of the present invention. The PWM controller 104 comprises an on-time control circuit 61 and a SR flip-flop 62. The on-time control circuit 61 is configured to receive the on-time threshold TON and the PWM signal, and is configured to provide an on-time control signal COTi based on the on-time threshold TON and the PWM signal. The SR flip-flop 62 has a set terminal S configured to receive the set signal Set and a reset terminal R configured to receive the on-time control signal COTi, and an output terminal Q configured to provide the PWM signal. In the example of FIG. 6, a corresponding switching circuit 40 is turned on (i.e., a corresponding high-side switch M1 is turned on and low-side switch M2 is turned off) by the PWM signal based on the set signal Set, and is turned off by the PWM signal based on the on-time control signal COTi.

Figure 7:
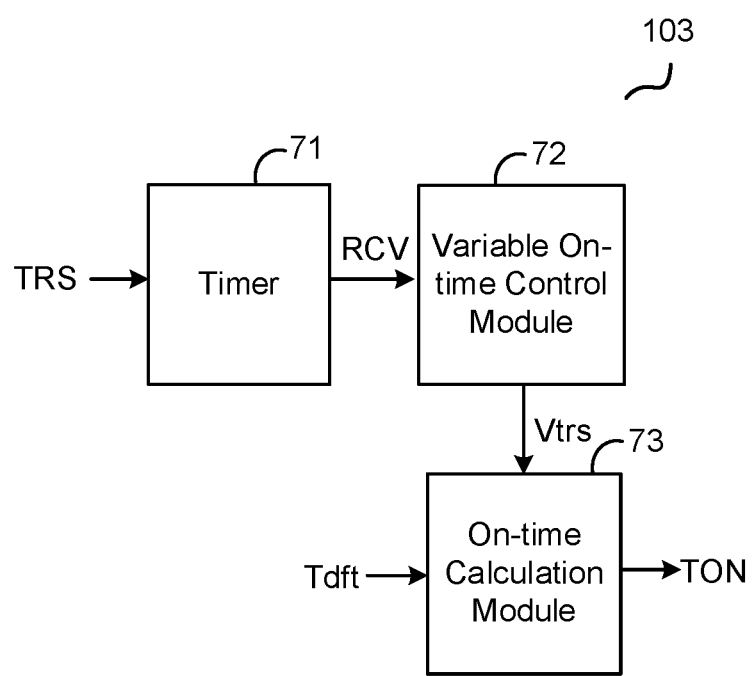
FIG. 7 schematically illustrates an on-time adjusting circuit 103 of the control circuit 10 shown in FIG. 2 in accordance with an embodiment of the present invention.

FIG. 7 schematically illustrates the on-time adjusting circuit 103 of the control circuit 10 shown in FIG. 2 in accordance with an embodiment of the present invention. In the example of FIG. 7, the on-time adjusting circuit 103 comprises a timer 71, a variable on-time control module 72, and an on-time calculation module 73.

The timer 71 is configured to receive a transient indicating signal TRS representative of the load transient condition, and start timing based on the transient indicating signal TRS. In one embodiment, when the transient indicating signal TRS indicates that the load transient condition is just finished (i.e., the load current ILoad starts to be stable at a current level after sharply decreasing or increasing), The timer 71 starts timing. In another embodiment, when the transient indicating signal TRS indicates that the load transient condition occurs, the timer 71 starts timing. The timer 71 is configured to provide the recovery control signal RCV based on the preset time period. The variable on-time control module 72 is configured to provide a variable control signal Vtrs based on the recovery control signal RCV. The variable control signal Vtrs is configured to reduce the on-time period Toni when the recovery control signal RCV indicates that the timer 71 starts timing, and the variable control signal Vtrs is configured to recover the on-time period Toni when the recovery control signal RCV indicates that the timing period reaches the preset time period. The on-time calculation module 73 is configured to provide the on-time threshold TON based on the variable control signal Vtrs and a default value Tdft. The default value Tdft may be a constant value or a variable value related with the input voltage Vin and/or the output voltage Vo. In one example, the on-time threshold TON is expressed by a following equation (1).

$$TON=Tdft-Vtrs \qquad (1)$$

In another example, the on-time threshold TON equals the default value Tdft when the variable control signal Vtrs is at a first state (e.g., lower than a voltage threshold), and the on-time threshold TON equals one half of the default value (i.e., Tdft/2) when the variable control signal Vtrs is at a second state (e.g., higher than the voltage threshold).

Figure 8:
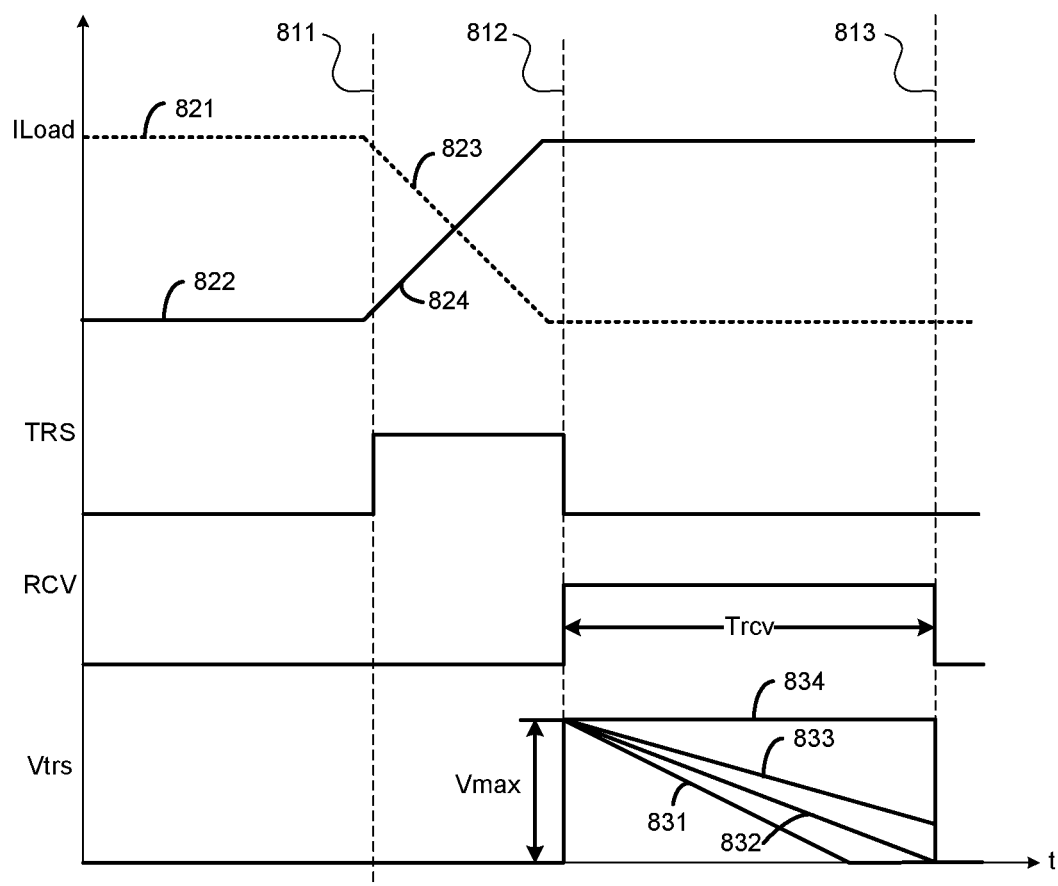
FIG. 8 shows a timing diagram of signals of the on-time adjusting circuit 103 in accordance with an embodiment of the present invention.

FIG. 8 shows a timing diagram of signals of the on-time adjusting circuit 103 in accordance with an embodiment of the present invention. FIG. 8 shows, from top to bottom, the load current ILoad (see 821 or 822), the transient indicating signal TRS, the recovery control signal RCV, and the variable control signal Vtrs.

Prior to a time point 811, the load current ILoad is at steady state (e.g., 100A as 821, or 10A as 822), both of the transient indicating signal TRS and the recovery control signal RCV keeps at a low voltage level, and the variable control signal Vtrs equals zero. At the time point 811, the load transient condition occurs (e.g., sharply increases as 824 shown, or sharply decreases as 823 shown), the transient indicating signal TRS transits to be the high voltage level to indicate that the load transient condition occurs. At a time point 812, the transient indicating signal TRS transits to be the low voltage level to indicate that the load transient condition is finished, and the timer 71 starts timing, the recovery control signal RCV transits to be the high voltage level, and the variable control signal Vtrs equals a maximum value Vmax. At a time point 813, the timing period of the timer 71 equals the preset time period, the recovery control signal RCV transits to be the low voltage level, and the timer 71 stops. In the example of FIG. 8, during the preset time period, the variable control signal Vtrs may decrease from the maximum value Vmax to zero (see 831 and 832), or may decrease from the maximum value Vmax to a value larger than zero (see 833), or may maintain the maximum value Vmax (see 834).

Figure 9:
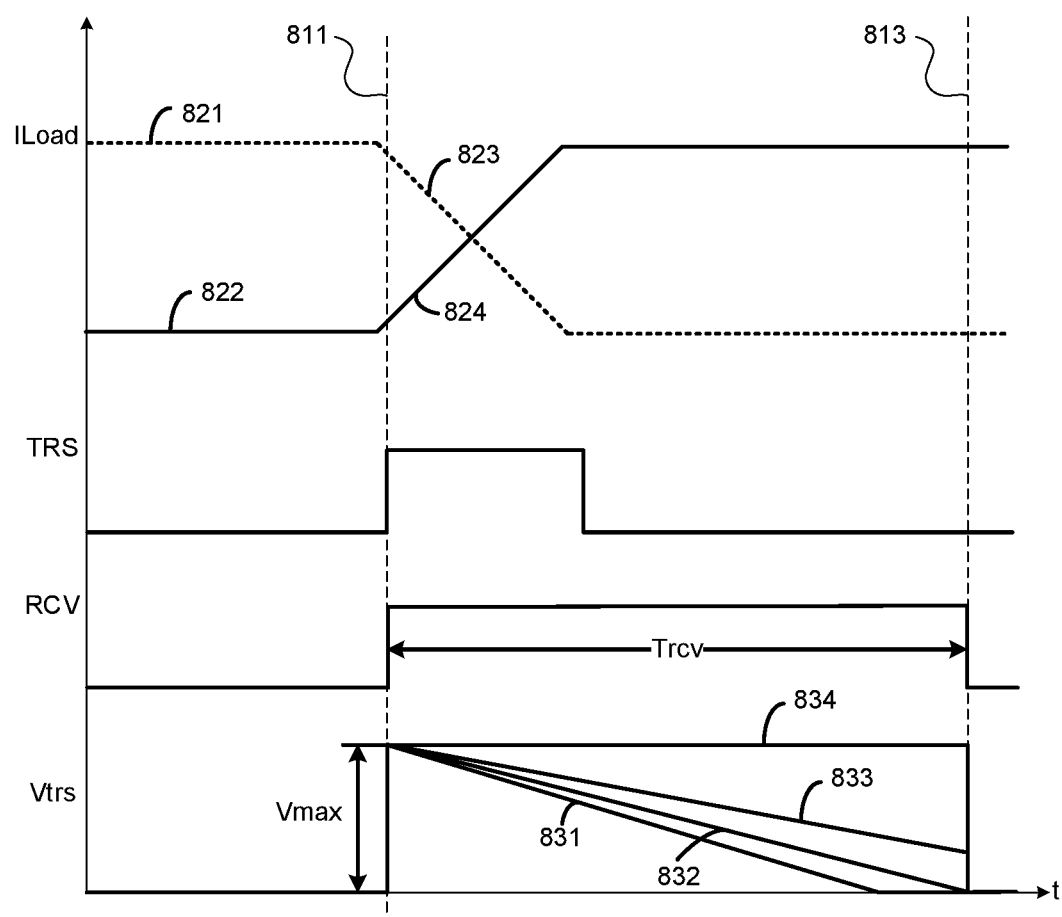
FIG. 9 shows a timing diagram of signals of the on-time adjusting circuit 103 in accordance with another embodiment of the present invention.

FIG. 9 shows a timing diagram of signals of the on-time adjusting circuit 103 in accordance with another embodiment of the present invention. FIG. 9 shows, from top to bottom, the load current ILoad (see 821 or 822), the transient indicating signal TRS, the recovery control signal RCV, and the variable control signal Vtrs.

In the example of FIG. 9, at the time point 811, the load transient condition occurs, the timer 71 starts timing, the recovery control signal RCV transits to be the high voltage level, and the variable control signal Vtrs equals a maximum value Vmax. At the time point 813, the timing period of the timer 71 equals the preset time period, the recovery control signal RCV transits to be the low voltage level, and the timer 71 stops. In the example of FIG. 9, during the preset time period, the variable control signal Vtrs may decrease from the maximum value Vmax to zero (see 831 and 832), or may decrease from the maximum value Vmax to a value larger than zero (see 833), or may maintain the maximum value Vmax (see 834).

Figure 10:
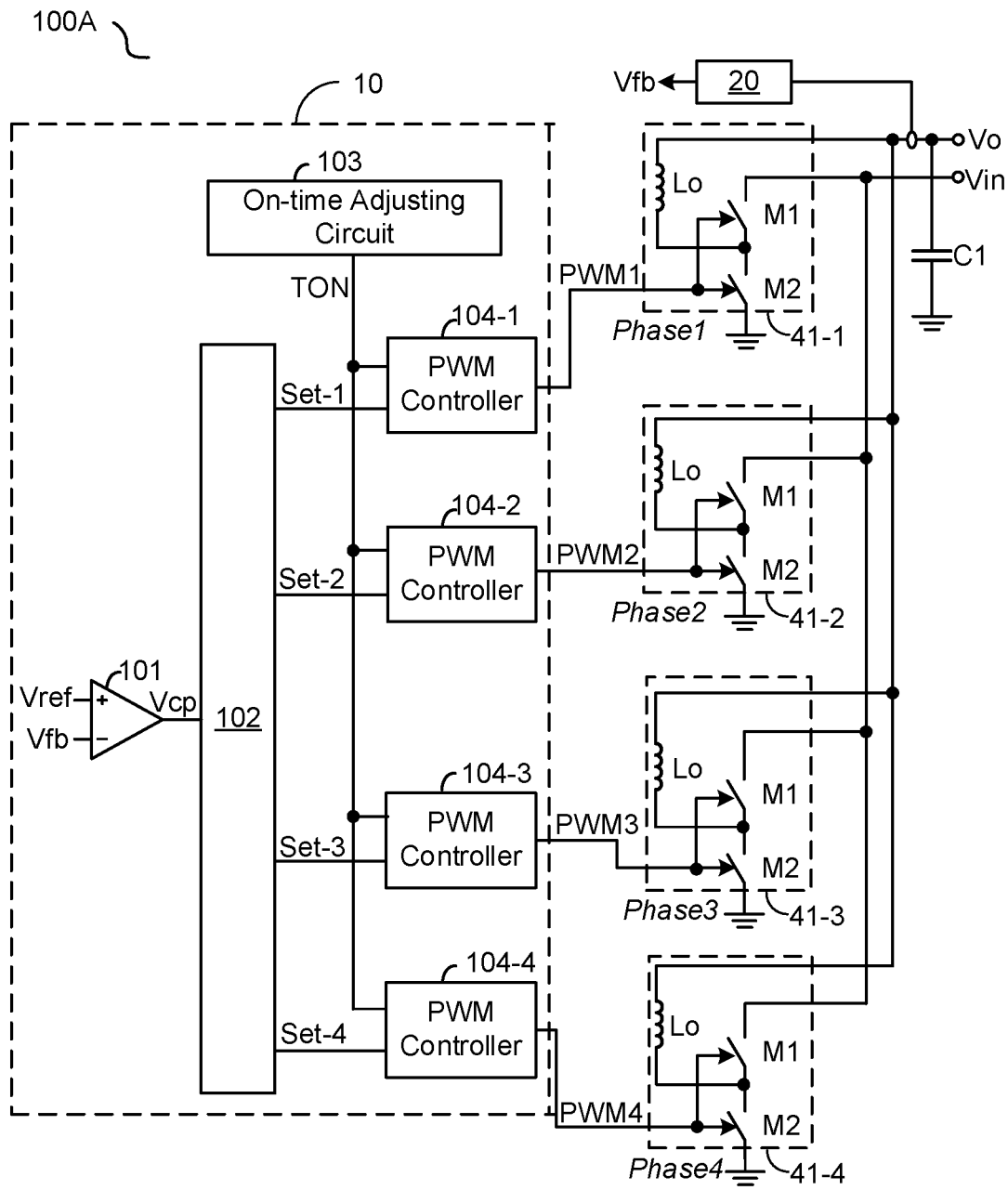
FIG. 10 schematically illustrates a multi-phase voltage regulator 100A with the control circuit 10 in accordance with an embodiment of the present invention.

FIG. 10 schematically illustrates a multi-phase voltage regulator 100A with the control circuit 10 in accordance with an embodiment of the present invention. In the example of FIG. 10, the multi-phase voltage regulator 100A has four phases. As can be appreciated, the multi-phase voltage regulator 100A may also be implemented with fewer or more phases. In the example of FIG. 10, the multi-phase voltage regulator 100A comprises a plurality of switching circuits 41 (i.e., 41-1, 41-2, 41-3, and 41-4), one for each phase. The switching circuits 41-1, 41-2, 41-3, and 41-4 are for phase1, phase 2, phase 3, and phase 4, respectively. The plurality of switching circuits 41-1, 41-2, 41-3, and 41-4 are coupled in parallel between the input voltage Vin and the output voltage Vo. And each of the plurality of switching circuits 41 may be a buck regulator comprising a high-side switch M1, a low-side switch M2 and an output inductor Lo.

Figure 11:
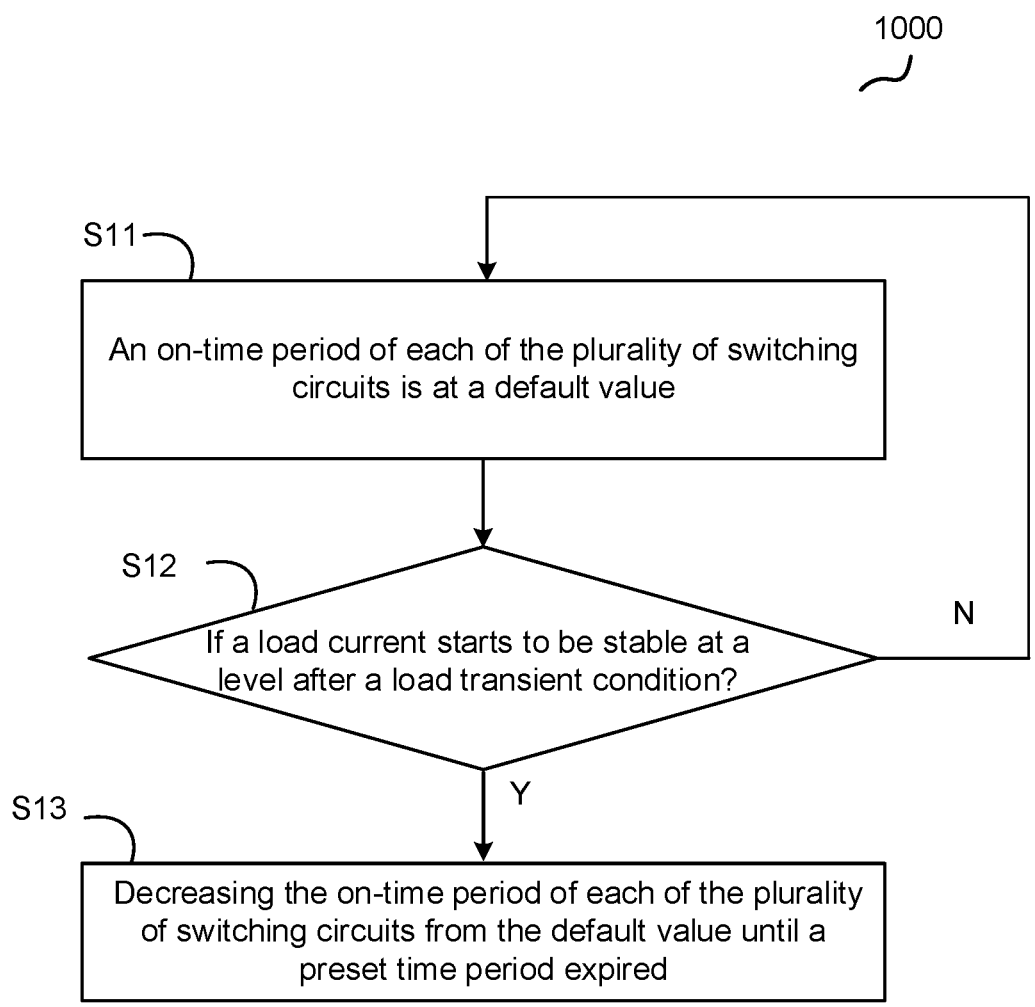
FIG. 11 illustrates a control method 1000 for a multiphase voltage regulator in accordance with an embodiment of the present invention.

FIG. 11 illustrates a control method 1000 for a multi-phase voltage regulator (including TLVR) in accordance with an embodiment of the present invention. The control method 1000 comprises steps S11-S13.

At step S11, an on-time period of each of the plurality of switching circuits is at a default value.

At step S12, if a load current starts to be stable at a level after a load transient condition, then go to step S13, otherwise back to step S11.

At step S13, decreasing the on-time period of each of the plurality of switching circuits from the default value until a preset time period expired.

Figure 12:
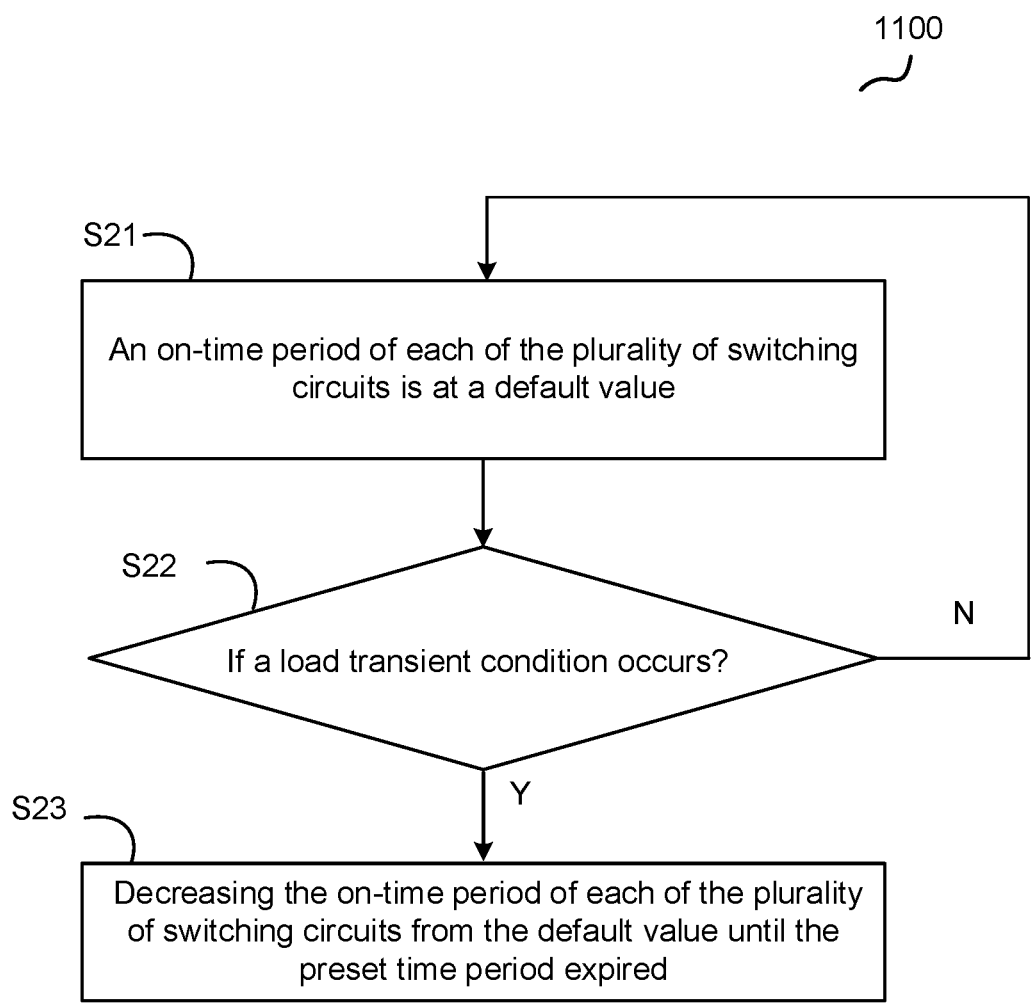
FIG. 12 illustrates a control method 1100 for the multiphase voltage regulator in accordance with an embodiment of the present invention.

FIG. 12 illustrates a control method 1100 for the multi-phase voltage regulator (including TLVR) in accordance with an embodiment of the present invention. The control method 1100 comprises steps S21-S23.

At step S21, an on-time period of each of the plurality of switching circuits is at a default value.

At step S22, if a load transient condition occurs, then go to step S23, otherwise back to step S21.

At step S23, decreasing the on-time period of each of the plurality of switching circuits from the default value until a preset time period expired.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What we claim is:

1. A trans-inductor voltage regulator (TLVR) circuit, configured to receive an input voltage and provide an output voltage to a load, the TLVR circuit comprising:
   a plurality of transformers, each of the plurality of transformers comprising a first winding and a second winding, the second windings of the plurality of transformers being connected in series;
   a plurality of switching circuits coupled in parallel between the input voltage and the output voltage, each of the switching circuits being connected to an output capacitor of the TLVR circuit by way of an output inductor, the output inductor being a first winding of a transformer of the plurality of transformers;
   a nonlinear compensation inductor that is connected in series with the second windings of the plurality of transformers, an inductance of the nonlinear compensation inductor varies with a current flowing through the nonlinear compensation inductor; and a control circuit, configured to provide a plurality of pulse width modulation (PWM) signals to control the plurality of switching circuits respectively, and the control circuit is configured to reduce an on-time period of each of the plurality of switching circuits when a load current starts to be stable after a load transient condition or when the load transient condition occurs.

2. The TLVR circuit of claim 1, wherein each of the switching circuits further comprises:

a high-side switch and a low side switch, a switch node between the high-side switch and the low-side switch being connected to a first end of a first winding of a transformer of the plurality of transformers, and a second end of the first winding of the transformer of the plurality of transformers being connected to an output capacitor.

3. The TLVR circuit of claim 1, wherein:

the control circuit is further configured to recover the on-time period of each of the plurality of switching circuits to a default value after a preset time period.

4. The TLVR circuit of claim 1, wherein:

the control circuit is configured to turn on one of the plurality of switching circuits based on a feedback signal representative of the output voltage and a reference signal, and configured to turn off the one of the plurality of switching circuits when the on-time period of the one of the plurality of switching circuits equals an on-time threshold.

5. The TLVR circuit of claim 4, wherein:

when the load transient condition occurs, the on-time threshold is reduced to less than a default value, and the on-time threshold recovers to the default value after a preset time period.

6. The TLVR circuit of claim 1, wherein the control circuit further comprises:

a comparison circuit, configured to provide a comparison signal based on a reference signal and a feedback signal representative of the output voltage;

a signal distribution circuit, coupled to the comparison circuit to receive the comparison signal, and the signal distribution circuit is configured to distribute the comparison signal to a plurality of set signals successively;

an on-time adjusting circuit, configured to provide an on-time threshold to control the on-time period of each of the plurality of switching circuits; and a plurality of PWM controllers, each of the plurality of PWM controllers is configured to receive one of the plurality of set signals and the on-time threshold, and is configured to provide one of the plurality of PWM signals based on the one of the plurality of set signals and the on-time threshold to control one of the plurality of switching circuits.

7. The TLVR circuit of claim 6, wherein each of the plurality of PWM controllers further comprises:

an on-time control circuit, configured to receive the on-time threshold and the one of the plurality of PWM signals, and configured to provide an on-time control signal based on the on-time threshold and the one of the plurality of PWM signals; and a RS flip-flop, having a set terminal, a reset terminal, and an output terminal, the set terminal is configured to receive the one of the plurality of set signals, the reset terminal is configured to receive the on-time control signal, and the output terminal is configured to provide the one of the plurality of PWM signals based on the one of the plurality of set signals and the on-time control signal.

8. The TLVR circuit of claim 6, wherein the on-time adjusting circuit further comprises:

a timer, configured to provide a recovery control signal based on a preset time period;

a variable on-time control module, configured to provide a variable control signal to reduce the on-time period during the preset time period; and an on-time calculation module, configured to provide the on-time threshold based on the variable control signal and a default value.

9. A control circuit for a multi-phase voltage regulator, the multi-phase voltage regulator having a plurality of switching circuits, each of the switching circuits being connected to an output capacitor of the multi-phase voltage regulator by way of an output inductor, the control circuit comprising:

a comparison circuit, configured to provide a comparison signal based on a reference signal and a feedback signal representative of an output voltage of the multi-phase voltage regulator;

an on-time adjusting circuit, configured to provide an on-time threshold to control an on-time period of each of the plurality of switching circuits; and a plurality of PWM controllers, configured to provide a plurality of PWM signals based on the comparison signal and the on-time threshold to control the plurality of switching circuits respectively, each of the plurality of PWM controllers is configured to reduce the on-time period of a corresponding one of the plurality of switching circuits when a load current starts to be stable after a load transient condition or when the load transient condition occurs.

10. The control circuit of claim 9, wherein the on-time adjusting circuit further comprises:

a timer, configured to provide a recovery control signal based on a preset time period;

a variable on-time control module, configured to provide a variable control signal to reduce the on-time period during the preset time period; and an on-time calculation module, configured to provide the on-time threshold based on the variable control signal and a default value.

11. The control circuit of claim 9, wherein each of the plurality of PWM controllers further comprises:

an on-time control circuit, configured to receive the on-time threshold and one of the plurality of PWM signals, and configured to provide an on-time control signal based on the on-time threshold and the one of the plurality of PWM signals; and a RS flip-flop, having a set terminal, a reset terminal, and an output terminal, the set terminal is configured to receive one of the plurality of set signals, the reset terminal is configured to receive the on-time control signal, and the output terminal is configured to provide the one of the plurality of PWM signals based on the one of the plurality of set signals and the on-time control signal.

12. The control circuit of claim 9, wherein:

each of the plurality of PWM controllers is configured to recover the on-time period of each of the plurality of switching circuits to a default value after a preset time period.

13. The control circuit of claim 9, further comprising:

a signal distribution circuit, coupled to the comparison circuit to receive the comparison signal, and the signal distribution circuit is configured to distribute the comparison signal to a plurality of set signals successively, and each of the PWM controllers is configured to receive one of the plurality of set signals to turn on the corresponding one of the plurality of switching circuits.

14. The control circuit of claim 9, wherein:
each of the plurality of PWM controllers is configured to turn on a corresponding one of the plurality of switching circuits based on the comparison signal, and turn off the corresponding one of the plurality of switching circuits when the on-time period of the corresponding one of the plurality of switching circuits equals the on-time threshold.

15. A control circuit for a TLVR circuit, the TLVR circuit having a plurality of switching circuits, each of the switching circuits being connected to an output capacitor of the TLVR circuit by way of an output inductor being a first winding of a transformer of a plurality of transformers, and a compensation inductor is connected in series with a plurality of second windings of the plurality of transformers, the control circuit comprising:
a comparison circuit, configured to provide a comparison signal based on a reference signal and a feedback signal representative of an output voltage of the TLVR circuit;
an on-time adjusting circuit, configured to provide an on-time threshold to control an on-time period of each of the plurality of switching circuits; and
a plurality of PWM controllers, configured to provide a plurality of PWM signals based on the comparison signal and the on-time threshold to control the plurality of switching circuits respectively, each of the plurality of PWM controllers is configured to reduce the on-time period of a corresponding one of the plurality of switching circuits when a load current starts to be stable after a load transient condition or when the load transient condition occurs.

16. The control circuit of claim 15, wherein the on-time adjusting circuit further comprises:
a timer, configured to provide a recovery control signal based on a preset time period;
a variable on-time control module, configured to provide a variable control signal to reduce the on-time period during the preset time period; and
an on-time calculation module, configured to provide the on-time threshold based on the variable control signal and a default value.

17. The control circuit of claim 15, wherein:
each of the plurality of PWM controllers is configured to recover the on-time period of each of the plurality of switching circuits to a default value after a preset time period.

18. The control circuit of claim 15, wherein each of the plurality of PWM controllers further comprises:
an on-time control circuit, configured to receive the on-time threshold and one of the plurality of PWM signals, and configured to provide an on-time control signal based on the on-time threshold and the one of the plurality of PWM signals; and
a RS flip-flop, having a set terminal, a reset terminal, and an output terminal, the set terminal is configured to receive one of the plurality of set signals, the reset terminal is configured to receive the on-time control signal, and the output terminal is configured to provide the one of the plurality of PWM signals based on the one of the plurality of set signals and the on-time control signal.

19. A control method used for a multi-phase voltage regulator, the multi-phase voltage regulator having a plurality of switching circuits, each of the switching circuits being connected to an output capacitor of the multi-phase voltage regulator by way of an output inductor, the control method comprising:
turning on the plurality of switching circuits successively based on a feedback signal representative of an output voltage of the multi-phase voltage regulator and a reference signal;
providing an on-time threshold to control an on-time period of each of the plurality of the switching circuits;
turning off a corresponding one of the plurality of switching circuits when the on-time period of the corresponding one of the plurality of the switching circuits equals the on-time threshold; and
decreasing the on-time period of each of the plurality of switching circuits when a load current starts to be stable after a load transient condition or when the load transient condition occurs.

20. The control method of claim 19, further comprising:
recovering the on-time period of each of the plurality of switching circuits to a default value after a preset time period.

* * * * *